M. BARTLEY.
NUT LOCK.
APPLICATION FILED JULY 8, 1912.

1,058,139.

Patented Apr. 8, 1913.

WITNESSES:

Milton Bartley INVENTOR

Atty

COLUMBIA PLANOGRAPH CO., WASHINGTON, D. C.

UNITED STATES PATENT OFFICE.

MILTON BARTLEY, OF PITTSBURGH, PENNSYLVANIA.

NUT-LOCK.

1,058,139.	Specification of Letters Patent.	Patented Apr. 8, 1913.

Application filed July 8, 1912. Serial No. 708,191.

*To all whom it may concern:*

Be it known that I, MILTON BARTLEY, a citizen of the United States, residing at Pittsburgh, in the county of Allegheny and State of Pennsylvania, have invented certain new and useful Improvements in Nut-Locks, of which the following is a specification.

My invention relates to improvements in nut locks and is designed to provide a device of this type which may be economically manufactured from a rolled metal blank having a main body portion punched out for passage of the bolt and a lateral thinned edge portion having a projecting rib, said edge portion being continuously integral with the body portion and bent up to provide a resilient member adapted to be partly depressed by the corners of the nut in turning, and to spring up and engage the flat edges thereof, to retain the nut in place.

The device is an improvement in that class of nut locks illustrated in my prior patent dated Jany. 17, 1911, No. 982223.

The nut lock is constructed and adapted to operate in the manner more fully hereinafter described.

Figure 1:
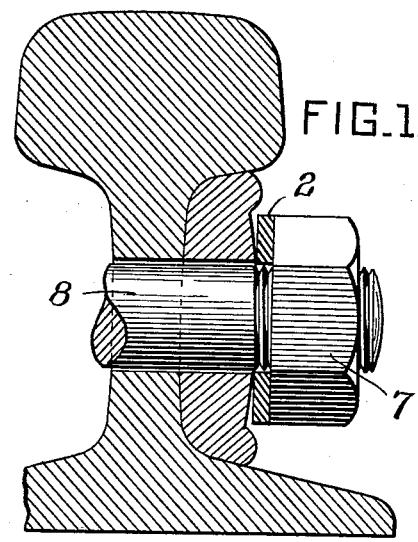
Figure 2:
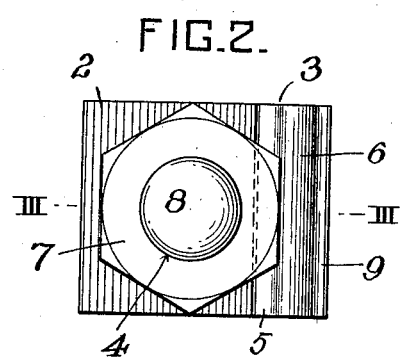
Figure 3:
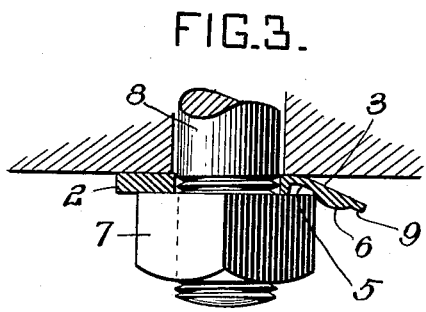
Figure 5:
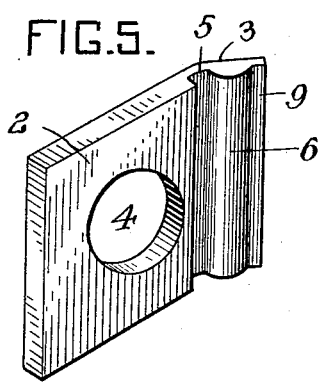
Figure 4:
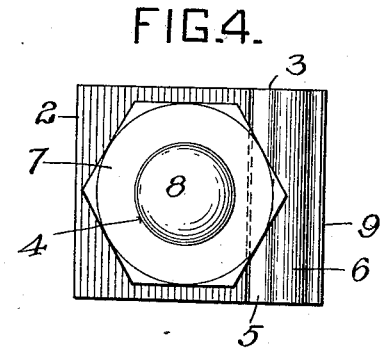

In the drawings—Figure 1 is a partial sectional view through a portion of a rail and fish plate showing the application of my improved nut lock to a bolt and nut. Fig. 2 is a view of the locking washer in front elevation, showing the nut in position thereon, screwed on the end of the bolt. Fig. 3 is a horizontal section showing a portion of the bolt and fish plate of a rail joint, taken on the line III. III. of Fig. 2. Fig. 4 is a view similar to Fig. 2, showing the nut in the operation of depressing the spring tongue. Fig. 5 is a perspective view of the nut lock, detached.

The main body portion of the lock consists of a rectangular metal plate 2 of suitable thickness having at one edge an integral wing extension 3 and a bolt hole 4 through the plate 2. The wing 3, which is co-extensive with the width of the plate 2, is joined with said plate by a connecting web 5 of considerably less thickness than the main body of the plate itself. The purpose of so reducing the thickness of web 5 is to provide sufficient resiliency in the wing 2, and also ample clearance for the corner of the nut in turning.

Extending outwardly from the face of wing 3 is a rib or bead 6 co-extensive with the length thereof, rounded on its outer face and adapted to be depressed by the corner of the nut 7 in turning the nut on the bolt 8, as indicated in Fig. 4. Wing 3 is bent outwardly at a considerable angle from the plane of the main body 2, as indicated, whereby to project the rib 6 in its normal position outwardly beyond the normal nut-supporting level of the outer face of the body 2, as shown. Outwardly beyond the rib 6 is a narrow ledge 9, of a reduced thickness approximating that of the web 5, the purpose of which is to give increased strength and stiffness to the wing and also provide a projecting edge for engagement by a tool in case it is desired to forcibly depress the wing for unscrewing. The web portion or the entire nut lock is preferably made of tempered steel so that the full resiliency of the entire width of the wing is utilized.

The operation of the device will be readily understood from the foregoing description. Its especial advantage resides in the positiveness of engagement against the nut, the facility for depression by the nut upon rotation of each face thereof, and engagement of the straight face or edge; its ease and economy of manufacture, and efficiency in service.

It will be understood that the device may be made in various sizes or proportions and may be adapted to a great variety of applications, or otherwise changed or varied by the skilled mechanic within the scope of the following claims.

Having described my invention, what I claim is:

1. A nut lock consisting of a rolled section of metal having a main body portion of uniform thickness provided with a bolt hole, an integral edge portion having a longitudinal projecting rounded rib, said edge portion being continuously connected by a web of reduced thickness with the main body portion and bent outwardly at an angle thereto, substantially as set forth.

2. A nut lock consisting of a rolled section of metal having a main body portion of uniform thickness provided with a bolt hole, an integral edge portion having a longitudinal projecting rounded rib, said edge portion being continuously connected by a web of reduced thickness with the main body portion and bent outwardly at an angle thereto, said wing portion having a projecting edge portion beyond the rib, substantially as set forth.

In testimony whereof I hereunto affix my signature in the presence of two witnesses.

MILTON BARTLEY.

Witnesses:
J. J. FOGARTY,
L. ASHMAN.